Aug. 7, 1934.   A. CLAAS ET AL   1,969,639
THRESHING APPARATUS WITH VERTICAL DRUM
Filed Nov. 6, 1933   2 Sheets-Sheet 1

Inventors
August Claas
Walter Gustav Brenner

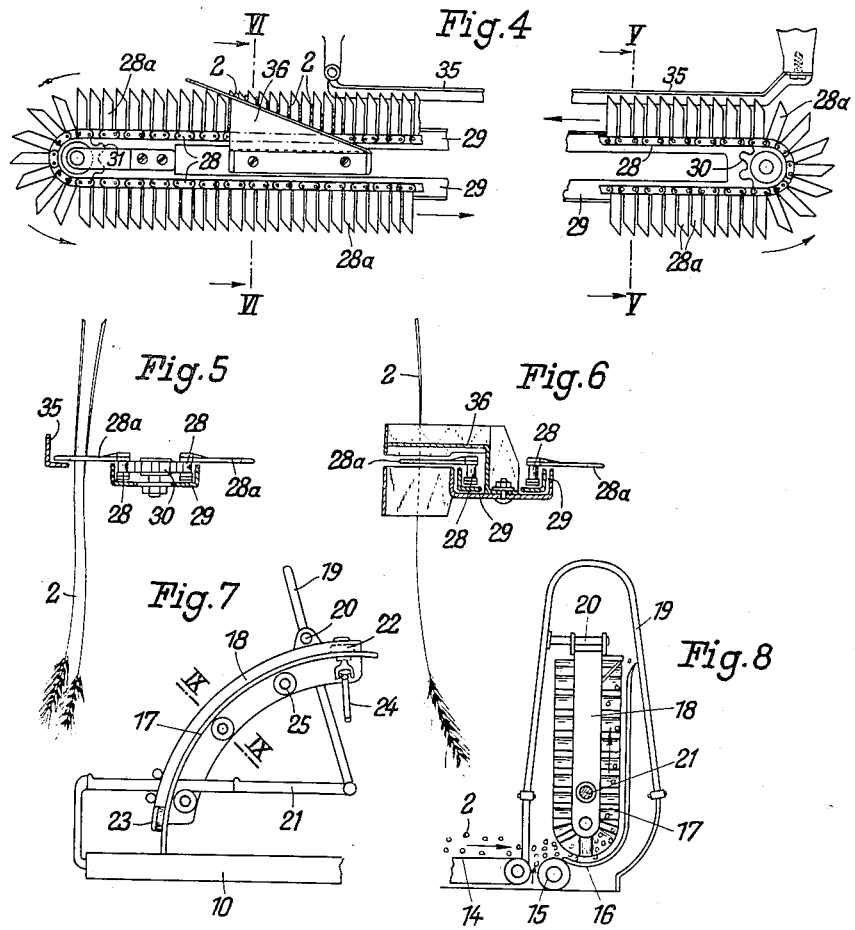
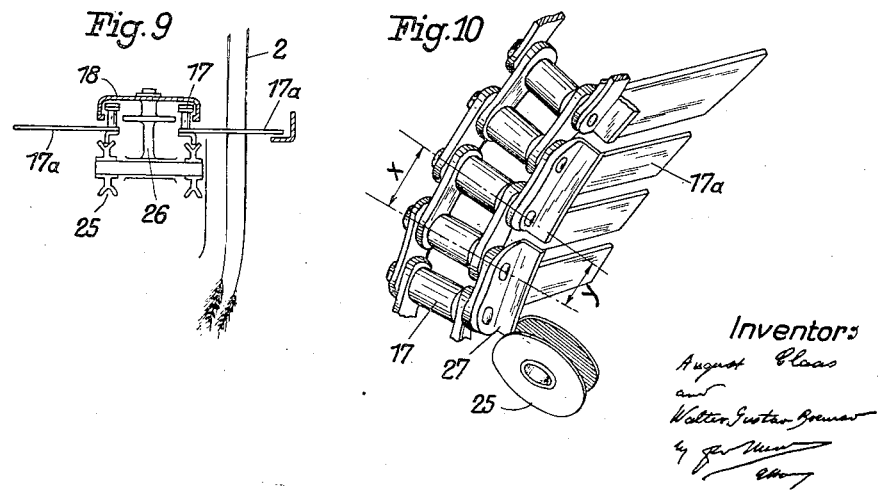

Patented Aug. 7, 1934

1,969,639

UNITED STATES PATENT OFFICE 1,969,639

THRESHING APPARATUS WITH VERTICAL DRUM

August Claas and Walter Gustav Brenner, Harsewinkel, Germany

Application November 6, 1933, Serial No. 696,858
In Germany April 24, 1931

15 Claims. (Cl. 56—123)

This invention relates to a feeding and delivering apparatus for threshing machines with vertical drum to the two admission apertures of which the stalks are fed parallel to the drum axis. The invention consists chefly in that for feeding the stalks to the drum a feeding device is used which supplies the stalks with the ears hanging downwards to the admission aperture of the threshing device. The front portion of this feeding device is so constructed and arranged that it grips the stalks lying on a horizontal platform near the stubble end and brings the stalks out of the horizontal into the vertical position.

Further, an endless conveyor is, according to the invention, arranged behind the vertical drum and grips the stalks leaving the threshing device and conveys the same in hanging position to a dumping place.

The feeding devices may consist of known endless conveyor bands or cloths. Endless conveyor chains are, however, particularly advantageous which are guided at the ends over sprocket wheels, and the links of which are provided with grippers. These grippers open when the chain runs over the sprockets, grip the stalks and close when the chain stretches, the stalks being gripped by the grippers and conveyed to the threshing device.

Moreover, devices are provided which push the stalks laterally out of the closed gripper cheeks at the dumping place, these devices being arranged either rigid or adjustable relative to the conveyor chains. The invention therefore relates also to the special constructions of these devices.

The invention may be employed for stationary threshing and also for threshing during harvesting.

Various advantages resulting from the employment of the invention are obtained. The cereal stalks are stretched by the weight of the ears so that the stalks, for the purpose of reducing the power consumption, are only partly subjected in known manner to the threshing operation, that is guided through the threshing device. Further the screen of stalks hanging from the endless conveyor can be brought without difficulty to the threshing device into the proper position, that is are lifted and lowered in the direction of the drum axis. Thus, an adaptation of the actual height of the crop, that is corresponding to the actual length of the stalks, can be attained. The chief advantage of the present manner of feeding to and discharging after the threshing is, that the grains can easily drop out of the stalk screen and the downwardly hanging ears, and that the grains, which are thrown out of the drum during the threshing, are caught so that they do not as hitherto, come into contact with the straw passing out of the drum. Consequently, the arrangement of a straw jigger behind the existing threshing device is not necessary, but merely a conveyor chain is required which conveys the stalks in hanging position from the drum to the dump.

Finally, it is possible by the feeding of the stalks in hanging position to employ a shorter drum because, in the case of long crop, the lower portion of the stalks can lag slightly behind without causing clogging or the like. The employment of a shorter drum, however, results in a lower power consumption and lighter weight of the device.

An embodiment of the invention is illustrated by way of example in the accompanying drawings in which:—

Fig. 4 shows in top plan view the feeding disc constructed as gripper chain and which feeds the stalks to the threshing drum.

Fig. 5 is a section on line V—V of Fig. 4.

Fig. 6 is a section on line VI—VI of Fig. 4.

Fig. 7 shows in side elevation the feeding device bringing the stalks into vertical position.

Fig. 8 is a front elevation of Fig. 7.

Fig. 9 is a section on line IX—IX of Fig. 8.

Fig. 10 shows a portion of the gripper chain in perspective view.

Figure 1:
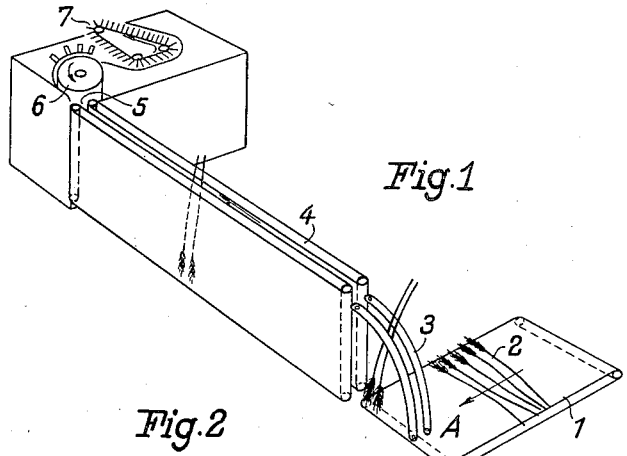
Fig. 1 is a diagrammatic view showing the operation of the threshing device.

As shown in Fig. 1 a horizontal platform 1 is formed by an endless conveyor band guided over rollers. The stalks 2 are spread on or drop during the mowing on to this conveyor band. They are then fed by the conveyor band to a laterally arranged gripper 3 which, according to the invention, grips the lower half of the stalks and lifts same with the ears hanging downwards and securely holds them in this position. The gripper 3 delivers the stalks to a feeding device 4 which feeds them to the admission aperture 5 of the threshing drum 6 in vertical position with the ears hanging downwards. The threshed stalks are then gripped on leaving the drum by another conveyor 7 and thrown out at the rear in swaths.

Figure 2:
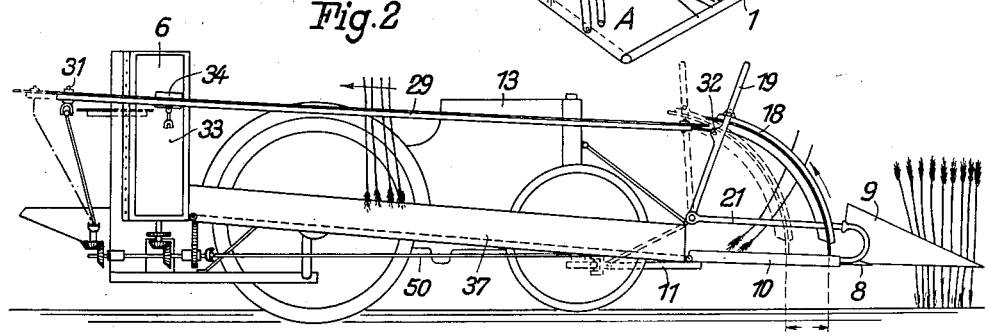
Fig. 2 shows diagrammatically in side elevation the employment of the threshing device for a combined harvester and threshing machine and Fig. 3 is a top plan view of Fig. 2, the known parts of the machine not forming part of the invention being omitted.
Figure 3:
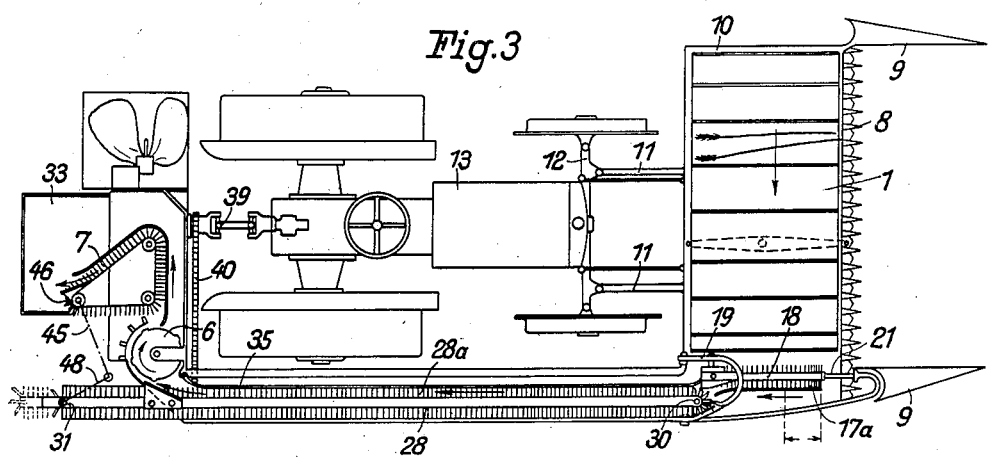
Figure 11:
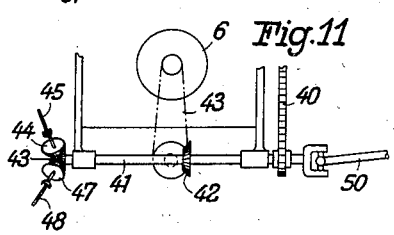
Figs. 11 and 12 show diagrammatically the driving of the several moved parts of the machine.
Figure 12:
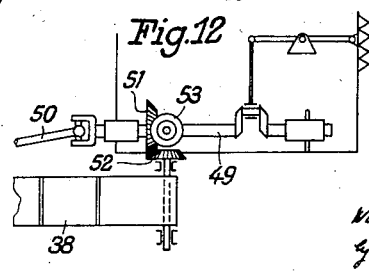

A harvesting and threshing machine operating on this principle is illustrated in Figs. 2 and 3. In this instance the platform 1 with a cutting mechanism 8 and dividers 9 is mounted on a frame 10 which is suspended on the front axle 12 of a tractor 13 by means of supporting arms 11.

The platform consists of an endless conveyor band 14 which feeds the stalks 2 lying thereon through the intermediary of a cylinder 15 (Fig. 8) to the lower end of an endless gripper chain 17 extending upwards in a curve. A curved bar 18 of U-shaped cross section serves as bearing and guide for this endless chain, and the upper end of this bar is connected with an adjusting strap 19 by a hinge 20, whereas its lower end rests on a supporting tube 21 mounted on the frame 10. Sprocket wheels 22 and 23 are mounted on the inner side of the curved bar one at the top and the other at the bottom, the gripper chain 17 running over these sprocket wheels. The upper sprocket wheel 22 is driven by a Cardan shaft 24. In order to guide the chain 17 in a curve the hinge bolts of the chain are directed towards the centre of this curve. (Fig. 10). The gripper chain 17 is supported by rollers 25 the axles of which are fixed on the curved bar 18 by intermediate elements 26. To reliably guide the chain small angle-pieces 27 are fixed on the inner connecting straps 22 of the chain links; the ends of said angle-pieces being only a relatively short distance apart so that, when the chain is stretched, they form a continuous curved bar which engages in the grooves of the supporting rollers 25.

Each link of the chain 17 carries a laterally projecting gripper 17a. The individual grippers, when the chain is stretched, are side by side in close proximity. They spread, however, when the chain runs over the sprocket wheels. The lower sprocket wheel 23 is arranged beside the roller 15 near the cutting mechanism 8, so that the grippers 17 open, when they run around the lower sprocket wheel 18 (Fig. 8), grip the stalks and lift the same so that they hang downwards from the upper bight of the chain with the ears directed downwards.

By oscillating the strap 19 the whole gripper chain 17 and therefore the gripping point can be adjusted relative to the cutting mechanism and the machine adapted to the different kinds of cereals, lengths of stalks and local conditions.

The stalks brought into vertical position by the gripper chain 17 are removed from the chain by a stripper 27 and fed to the conveying device 4. This conveying device, which is arranged at the side of the tractor 13, may consist of known endless bands or belts (Fig. 1) or of a gripping chain 28 (Fig. 4). This gripper chain is mounted in a bar 29 of V-shaped cross section, conducted around two sprocket wheels 30 and 31. The bar 29 is connected at one end with the strap 19 by a hinge 32 and shiftably mounted at the other end in a shoe 34 arranged on the frame 33 of the threshing device.

The grippers 28a of the chain opening on the sprocket wheel 30 remove the stalks from the gripper chain 17 and convey them to the threshing drum 6. In order to prevent the stalks from falling out laterally, the outer ends of the grippers 28a run along a bar 35 which extends up to the drum 7.

The depositing of the stalks is effected by upwardly inclined strippers 36 arranged on the shoe 34 and extending to within close proximity to the gripper arms, said strippers pushing the stalks laterally out of the closed chain. This arrangement presents the advantage that, even in the case of a longitudinal shifting of the bar 29 together with the gripper chain, the stalks are always delivered at the same point. This is important, besides for the adjustment to different kinds of cereals, also when the harvesting and threshing machine moves for example over undulating ground and consequently the cutting mechanism arranged in front of the tractor assumes different angles of inclination to the horizontal plane.

The conveying device 4 or 36 may be constructed so that it is adjustable in vertical direction, for example by fitting the shoe 34 at different heights on the threshing box. It is thus possible to make the stalks to extend more or less deeply into the drum and to submit them to the threshing operation.

In order to prevent any grains from becoming lost by falling out during the conveying of the stalks to the threshing drum, a trough 37 is arranged under the conveyor 4 or 28 and preferably provided with a conveyor band or the like 38 moved towards the drum.

The threshed stalks are taken up by a conveying device 7 which deposits them towards the rear.

This conveying device is preferably constructed in a similar manner to the gripper chain 28.

The threshing arrangement proper is of known type and therefore not shown in detail. A difference consists only in that separate jiggers are omitted.

The drive is effected by a stub shaft 39 of the tractor 13, the rotation of which shaft is transmitted by a chain drive 40 to a main driving shaft 41 from which the other drives are derived. The threshing drum is driven from this shaft by means of a pair of bevel wheels 42 and a chain drive 43. On the end of the shaft 41 a bevel wheel 43' is keyed and meshes with two bevel wheels 44 and 47. The bevel wheel 44 drives through the intermediary of a Cardan shaft 45 a sprocket wheel 46 for driving the conveyor chain 7. The other bevel wheel 47 drives by means of a Cardan shaft 48 the sprocket wheel 31 of the conveyor chain 28.

A counter shaft 49 is also journalled in the frame 10 and rotated from the shaft 41 through the intermediary of a Cardan shaft 50. The knife drive is derived from the shaft 49 by means of a crank drive. Moreover, the driving of the movable bottom 38 of the collecting trough 37 is effected by a pair of bevel wheels 51 and 52 and the shaft 24 for driving the gripper chain is rotated by the pair of bevel wheels 51, 53.

The threshing harvester may also be employed without alteration as stationary threshing machine. It is only necessary to disengage the drive for the cutting mechanism and to place the sheaves distributed on the platform.

When employed as a stationary thresher the conveying devices 4 may be omitted and the gripper bringing the stalks into vertical position may be mounted directly in front of the threshing drum and convey the stalks directly to the drum.

We claim:—

1. A threshing device, comprising in combination with a vertical drum having an admission aperture, an endless feeding device adapted to feed the stalks to the aperture of the drum parallel to the axis thereof, with the stalks in vertical position with the ears hanging downwards.

2. A threshing device as specified in claim 1, in which the feeding device is so narrow that it only grips the stalks on a short length and feeds them to the threshing drum in freely hanging position.

3. A threshing device as specified in claim 1, comprising in combination with the threshing drum and the feeding device, a trough under said feeding device adapted to catch any falling grains and ears, and a conveyor band in said trough travelling towards said threshing drum.

4. In a threshing device as specified in claim 1, the feeding device comprising in combination an endless gripper chain, sprocket wheels guiding said endless chain, and grippers projecting laterally from the individual links of said chain adapted to tightly clamp in the stretched position of the chain the straw stalks and to open for gripping the stalks when running over the foremost of said sprocket wheels.

5. A threshing device as specified in claim 1, comprising in combination with the feeding device, including a gripper chain with grippers projecting laterally therefrom, a guide bar extending along the path of movement of the ends of said grippers, and adapted to prevent the stalks from dropping out laterally from said grippers.

6. A threshing device as specified in claim 1, comprising in combination with the feeding device, including a gripper chain with grippers projecting laterally therefrom, an upwardly inclined stripper extending to within close proximity to said grippers adapted to push the stalks laterally out of the closed chain.

7. A threshing device as specified in claim 1, comprising in combination with the drum and the feeding device, means for adjusting said feeding device parallel to the axis of said drum.

8. A threshing device as specified in claim 1, comprising in combination with the feeding device, a horizontal platform, and an endless gripper adapted to grip stalks lying on said platform and to supply them to said feeding device in vertical position with their ears directed downwardly.

9. A threshing device as specified in claim 1, comprising in combination with the feeding device, a horizontal platform, an endless gripper including an upwardly curved gripper chain, adapted to convey the stalks from said platform to said feeding device, and hinge pins of said chain directed towards a common centre in the curve along which the chain travels.

10. A threshing device as specified in claim 1, comprising in combination with the feeding device, a horizontal platform, an endless gripper including an upwardly curved gripper chain, adapted to convey the stalks from said platform to said feeding device, hinge pins of said chain directed towards a common centre in the curve along which the chain travels, and supporting rollers adapted to support the underside of said chain.

11. A threshing device as specified in claim 1, comprising in combination with the feeding device, a horizontal platform, an endless gripper including an upwardly curved gripper chain, adapted to convey the stalks from said platform to said feeding device, hinge pins of said chain directed towards a common centre in the curve along which the chain travels, supporting rollers adapted to support the underside of said chain, straps connecting the links of said chain, angle bars fitted on said chain abutting at their ends, to form a continuous curved guide bar adapted to support said rollers.

12. A threshing device as specified in claim 1, comprising in combination with the drum having a delivering aperture, an endless conveying device arranged behind the delivering aperture of said drum adapted to grip the stubble ends of the stalks leaving said drum and to convey the same to dump with their ears directed downwardly.

13. A threshing device as specified in claim 1, comprising in combination with the feeding device, a tractor carrying the threshing device at its rear end, and a platform with cutting mechanism in front of said tractor, said feeding device arranged laterally of said tractor extending from said platform to said threshing device.

14. A threshing device as specified in claim 1, comprising in combination with the feeding device, a tractor carrying the threshing device at its rear end, a platform with cutting mechanism in front of said tractor, said feeding device arranged laterally of said tractor extending from said platform to said threshing device, and means for mutually adjusting said feeding device and said cutting mechanism.

15. A threshing device as specified in claim 1, comprising in combination with the feeding device including a conveyor chain, a tractor, a threshing drum at the rear end of said tractor, a platform with cutting mechanism in front of said tractor, fixed relative to said drum, strippers adapted to push the stalks off said conveyor chain, and means for longitudinally shifting said chain relative to said strippers.

AUGUST CLAAS.
WALTER GUSTAV BRENNER.